United States Patent
Wang (10) Patent No.: US 7,969,714 B2
(45) Date of Patent: Jun. 28, 2011

(54) APPARATUS FOR CONTROLLING MONITOR AND METHOD THEREOF

(75) Inventor: Hee-Il Wang, Seoul (KR)

(73) Assignee: LG Electronics Inc., Seoul (KR)

( * ) Notice: Subject to any disclaimer, the term of this patent is extended or adjusted under 35 U.S.C. 154(b) by 1426 days.

(21) Appl. No.: 11/275,248

(22) Filed: Dec. 20, 2005

(65) Prior Publication Data
US 2007/0046850 A1 Mar. 1, 2007

(30) Foreign Application Priority Data
Dec. 23, 2004 (KR) .................. 10-2004-0110933

(51) Int. Cl.
*H05K 5/00* (2006.01)
*H05K 7/00* (2006.01)
*G09G 5/00* (2006.01)

(52) U.S. Cl. ......... 361/679.01; 361/679.02; 361/679.04; 361/679.06; 361/679.07; 345/156

(58) Field of Classification Search ............... 345/168, 345/169, 156, 157, 905; 361/679.01–679.45, 361/679.55–679.59, 724–727; 248/917–924
See application file for complete search history.

(56) References Cited

U.S. PATENT DOCUMENTS

| 5,179,447 A | 1/1993 | Lain |
| D391,251 S * | 2/1998 | Yuyama et al. ............... D14/132 |
| 2003/0142063 A1* | 7/2003 | Wang et al. .................... 345/156 |

FOREIGN PATENT DOCUMENTS

| JP | 09-039675 | | 2/1997 |
| JP | 11-051662 | | 2/1999 |
| JP | 11051662 A | * | 2/1999 |
| JP | 11-316555 | | 11/1999 |
| JP | 2002-347474 | | 12/2002 |

OTHER PUBLICATIONS

International Search Report dated Apr. 7, 2006, Application No. PCT/KR2005/004363, (8 pages).

* cited by examiner

*Primary Examiner* — Jayprakash N Gandhi
*Assistant Examiner* — Jerry Wu
(74) *Attorney, Agent, or Firm* — Fish & Richardson P.C.

(57) ABSTRACT

An apparatus and method for controlling a monitor are disclosed to easily retract or protract a monitor. The method for controlling a monitor includes drawing out a monitor in a horizontal direction of the monitor from a monitor reception space; rotating the monitor by a first pre-set angle in the horizontal direction; and rotating the rotated monitor by a second pre-set angle in a left or right direction of the monitor.

18 Claims, 8 Drawing Sheets

APPARATUS FOR CONTROLLING MONITOR AND METHOD THEREOF

BACKGROUND OF THE INVENTION

1. Field of the Invention

The present invention relates to a monitor and, more particularly, to an apparatus for controlling a monitor and its method.

2. Description of the Related Art

In general, a telematics terminal is mounted in a car (mobile vehicle) and connected with a wireless communication network, provides a call function, map information, a multimedia function and a GPS (Global Positioning System) navigation function, and includes an audio/video system.

The telematics terminal will now be described with reference to FIGS. 1 and 2.

Figure 1:
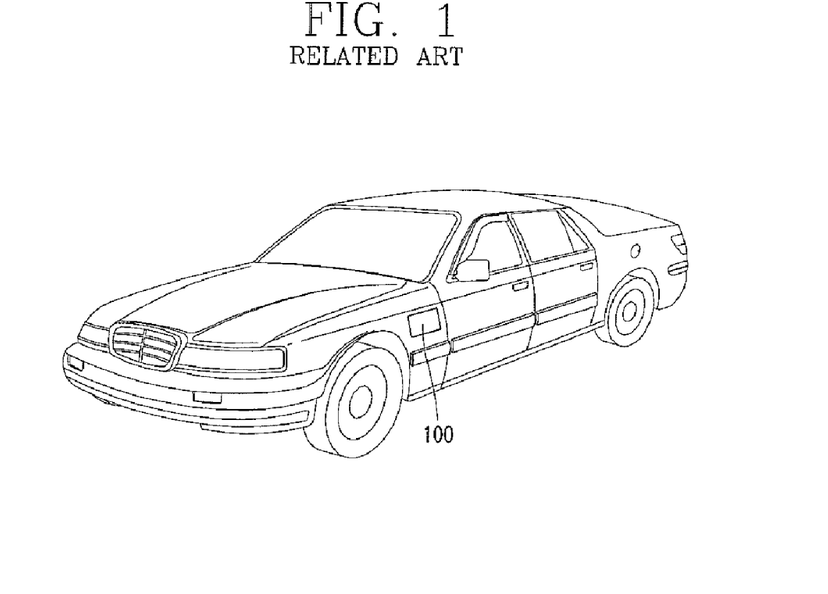
FIG. 1 shows a general telematics terminal mounted in a vehicle.
Figure 2:
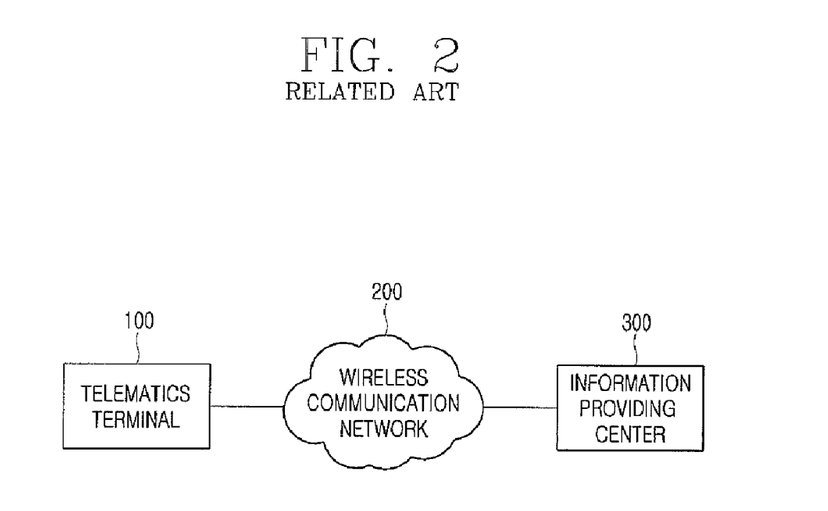
FIG. 2 is a schematic block diagram showing the construction of a telematics system in accordance with a related art.

FIG. 1 shows a general telematics terminal 100 mounted in a car, and FIG. 2 is a schematic block diagram showing a telematics system in accordance with a related art.

As shown in FIG. 2, the related art telematics system includes an information providing center 300 for providing telematics service information such as a call function, map information, traffic information and multimedia information, and a telematics terminal 100 for receiving the telematics service information through a wireless communication network 200 and providing the received telematics service information to users.

In the related art, a monitor of the telematics terminal is installed at its front surface. For example, the LCD (Liquid Crystal Display) monitor of 8 inches or wider of the telematics terminal is installed at the front surface of the telematics terminal located inside the vehicle, it is exposed so that when the vehicle is running, the monitor can be damaged. In addition, since someone else may watch the monitor from outside of the vehicle, it can be stolen.

BRIEF DESCRIPTION OF THE INVENTION

Therefore, one object of the present invention is to provide an apparatus and method for controlling a monitor capable of easily receiving (retracting) the monitor.

Another object of the present invention is to provide an apparatus and method for controlling a monitor capable of allowing a user to conveniently watch a wide monitor having a horizontal length greater than its vertical length.

To achieve these and other advantages and in accordance with the purpose of the present invention, as embodied and broadly described herein, there is provided a method for controlling a monitor comprising: drawing out (protracting) a monitor in a horizontal direction of the monitor from a monitor reception space; rotating the monitor by a first pre-set angle in the horizontal direction; and rotating the rotated monitor by a second pre-set angle in a left or right direction of the monitor.

To achieve the above objects, there is also provided an apparatus for controlling a monitor in which a monitor is inserted (retracted) into a monitor reception space in a horizontal direction of the monitor, or the monitor is drawn out of (protracted from) the monitor reception space in the horizontal direction of the monitor and rotated by a pre-set angle in the horizontal direction, and then the rotated monitor is again rotated by the pre-set angle in a left or right direction of the monitor.

To achieve the above objects, there is also provided a method for controlling a monitor comprising: drawing a wide LCD monitor in a horizontal direction out of a monitor reception space of a telematics terminal; standing the wide LCD monitor by 90 degrees; and rotating the stood monitor in a left or right direction of the wide LCD monitor.

To achieve the above objects, there is also provided an apparatus for controlling a monitor comprising: a controller for generating a control signal according to a user request; and a driving unit for inserting the a wide LCD monitor having a horizontal length greater than a vertical length into a telematics terminal in the horizontal direction or drawing out the inserted wide LCD monitor in the horizontal direction, standing the drawn wide LCD monitor by 90 degrees, and rotating the stood wide LCD monitor 90 degrees clockwise or counterclockwise, based on the control signal.

To achieve the above objects, there is also provided an apparatus for controlling a monitor comprising: a monitor transference unit for supporting a monitor of a telematics terminal; a first driving unit installed at the monitor transference unit and moving the monitor transference unit out of the telematics terminal; a second driving unit installed at the monitor transference unit and rotating the monitor in a horizontal direction of the monitor by a pre-set angle; a third driving unit installed at the monitor and rotating the monitor by a pre-set angle clockwise or counterclockwise; and a controller for controlling the first to third driving units.

To achieve the above objects, there is also provided an apparatus for controlling a monitor comprising: a rack gear installed in a telematics terminal; a monitor transference unit for supporting a wide LCD monitor of the telematics terminal, positioned at an upper side of the rack gear, and transferring the wide LCD monitor along the rack gear; a first motor installed inside the monitor transference unit and rotating a first gear in mesh with the rack gear; a second motor installed within the monitor transference unit and connected with a second gear which rotates the wide LCD monitor in a horizontal direction of the wide LCD monitor by a pre-set angle; a third motor installed at the wide LCD monitor and connected with a third gear which rotates the wide LCD monitor in a clockwise or counterclockwise direction of the wide LCD monitor; and a controller for controlling the first to third monitors.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

An apparatus and method for controlling a monitor capable of allowing a user to conveniently watch an image through the monitor by drawing a wide monitor (e.g., a wide LCD (Liquid Crystal Display) having a 16:9 screen ratio) having a horizontal length greater than its vertical length in the horizontal direction out of a monitor reception space of a telematics terminal, rotating the wide monitor in the horizontal direction by a pre-set angle, and rotating the rotated wide monitor in the left or right direction of the wide monitor by the pre-set angle, in accordance with the preferred embodiments of the present invention will now be described with reference to FIGS. 3A to 10.

FIGS. 3A to 3E show that a monitor is automatically drawn out or received through a monitor control apparatus of a telematics terminal in accordance with the present invention.

Figure 3A:
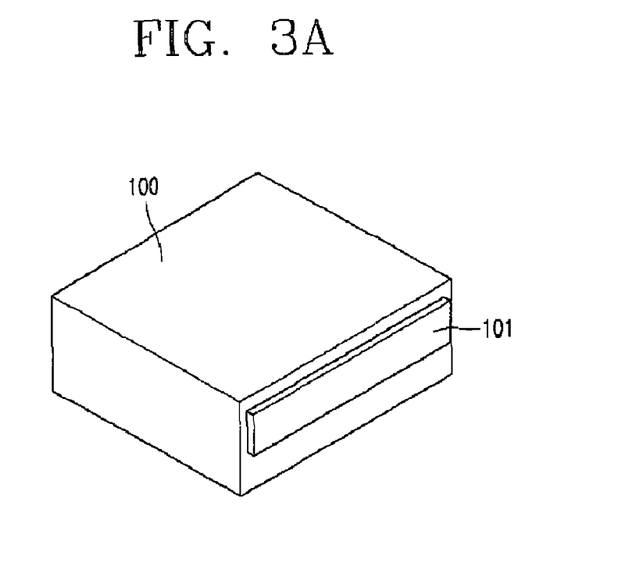
FIGS. 3A to 3E show that a monitor is automatically drawn out or received through a monitor control apparatus of a telematics terminal in accordance with the present invention.

As shown in FIG. 3A, a monitor 101 of a telematics terminal 100 in accordance with a preferred embodiment of the present invention is a wide LCD monitor having a horizontal length greater than its vertical length. A vertical direction of the monitor 101 is parallel to a horizontal direction of a receiving space of the telematics terminal 100, and the monitor 101 is received in the monitor reception space of the telematics terminal 100. Namely, the wide LCD monitor 101 is inserted into the telematics terminal 100 in the horizontal direction.

Figure 3B:
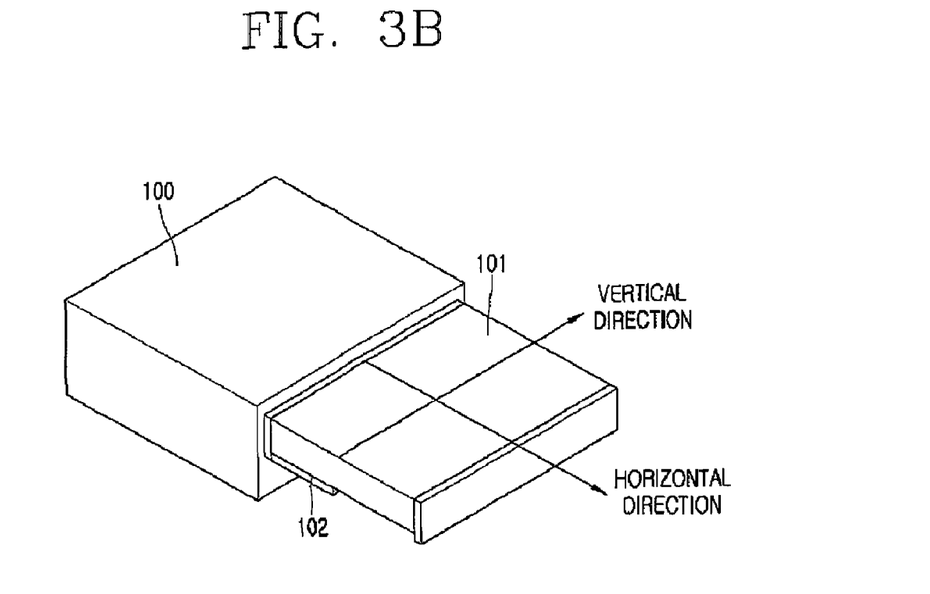

As shown in FIG. 3B, according to the apparatus for controlling the monitor of the telematics terminal 100, the monitor 101 inserted in the monitor reception space in the telematics terminal 100 is drawn out in the horizontal direction. At this time, preferably, the monitor 101 is drawn out of the telematics terminal 100 so that it can be rotated by a pre-set angle (e.g., 90°) in the horizontal direction. Herein, the monitor 101 is supported by a monitor transference unit 102.

Figure 3C:
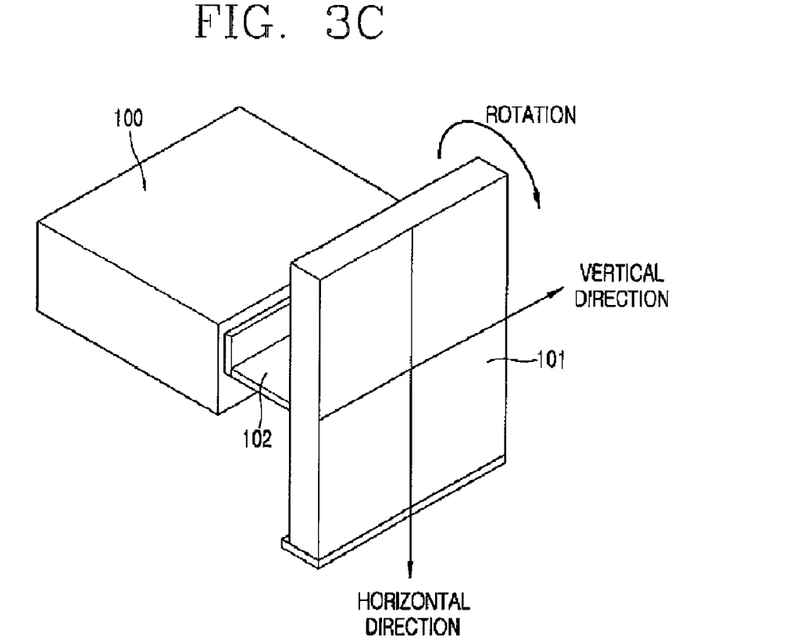

With reference to FIG. 3C, the apparatus for controlling the monitor of the telematics terminal 100 rotates the monitor 101 by the pre-set angle (e.g., 90°) in the horizontal direction. For example, by standing the drawn monitor 101 by 90°, a screen of the monitor 101 and a front surface of the telematics terminal 100 can be parallel.

Figure 3D:
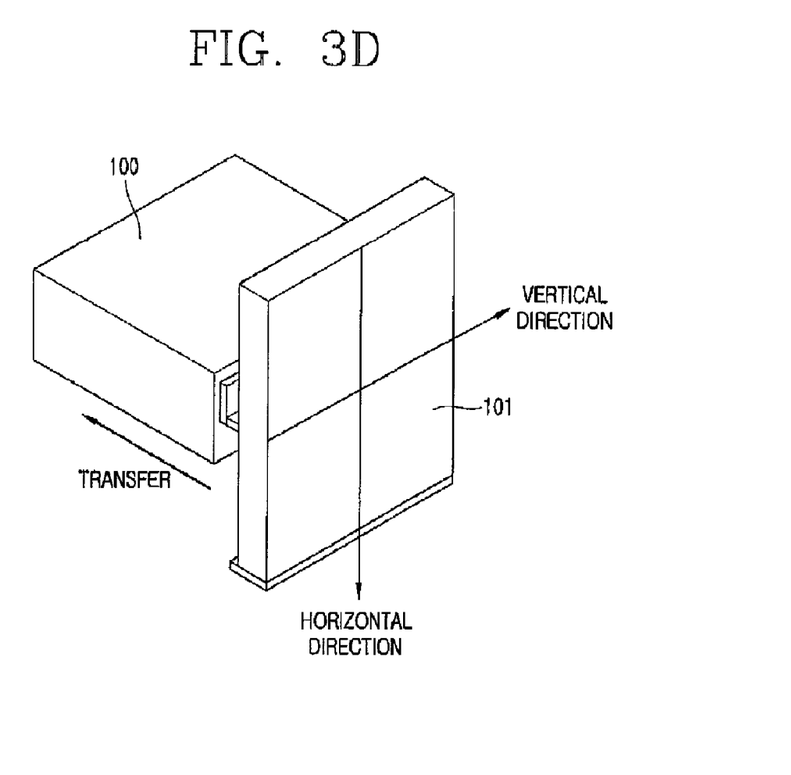

As shown in FIG. 3D, when the screen of the monitor 101 and the front surface of the telematics terminal 100 are maintained to be parallel, the apparatus for controlling the monitor of the telematics terminal 100 moves the monitor transference unit 102 to the monitor reception space of the telematics terminal 100 so that the internal space of the vehicle can be more spacious.

Figure 3E:
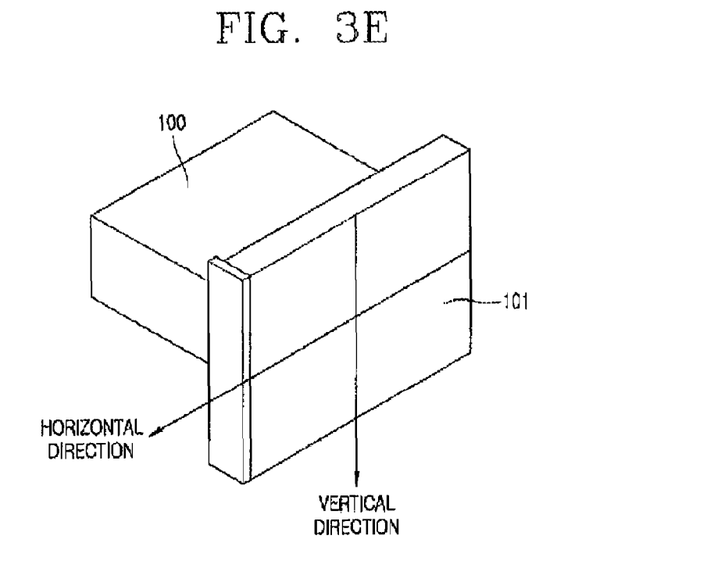

With reference to FIG. 3E, the apparatus for controlling the monitor of the telematics terminal 100 moves the monitor transference unit 102 into the monitor reception space of the telematics terminal 100 and then rotates it in the clockwise or counterclockwise direction (e.g., the left or right direction of the monitor 101) by the pre-set angle (e.g., 90°). Accordingly, the user can view a desired image through the wide LCD monitor 101 having the wide screen.

Herein, the process of receiving the monitor 101 is performed in the reverse order of the process of drawing out the monitor 101. That is, the process of receiving the monitor 101 is performed in the order of FIG. 3E→FIG. 3D→FIG. 3C→FIG. 3B→FIG. 3A.

Figure 4:
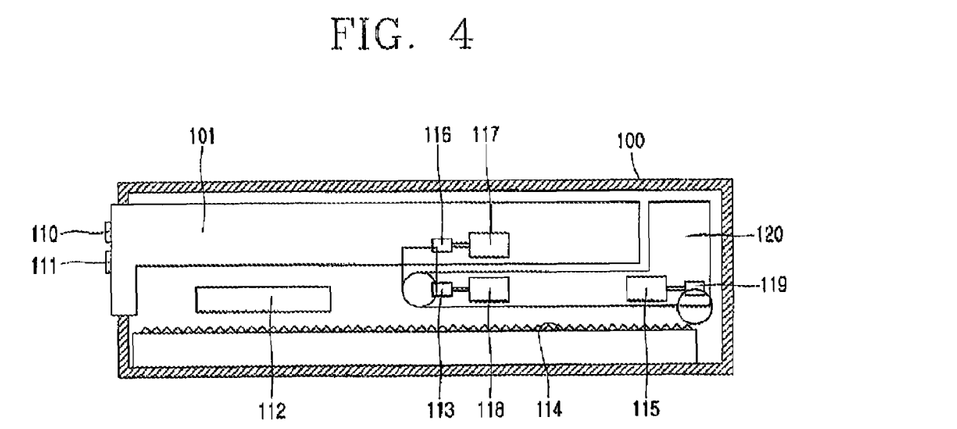
FIG. 4 is a block diagram showing the construction of an apparatus for controlling the monitor of the telematics terminal in accordance with the present invention.

FIG. 4 is a block diagram showing the construction of an apparatus for controlling the monitor of the telematics terminal in accordance with the present invention.

The apparatus for controlling the monitor of the telematics terminal 100 in accordance with the embodiment of the present invention can be modified to various structures by a designer based on FIGS. 3A to 3E.

As shown in FIG. 4, the apparatus for controlling the monitor includes: a rack gear 114 installed at a lower portion inside the telematics terminal 100; an open/close button 110 for generating a signal for protracting the monitor 101 from the front surface direction of the telematics terminal 100 or generating a signal for retracting the monitor 101 into the monitor reception space of the telematics terminal 100 according to a user selection; an angle control button 111 for controlling a rotation angle of the monitor 101 to adjust the monitor 101 suitably to a viewing angle of a user when the monitor is drawn out; a monitor transference unit 120 supporting the monitor 101, positioned at an upper portion of the rack gear 114, and moving the monitor 101 to outside or inside of the telematics terminal 100 along the rack gear 114; a first driving unit (e.g., a first motor) 115 installed inside the monitor transference unit 102 and rotating a first gear 119 in mesh with the rack gear 114; a second driving unit (e.g., a second motor) 118 installed inside the monitor transference unit 120 and rotating a second gear 113 in mesh with a gear (not shown) installed at a rear surface of the monitor 101 in order to rotate the monitor 101 by a pre-set angle (e.g., 90 degrees) in the horizontal direction of the monitor; a third driving unit 117 installed at a central portion inside the monitor 101 and rotating a third gear 116 in mesh with a gear (not shown) installed at the rear surface of the monitor 101 in order to rotate the monitor 101 by a pre-set angle (90 degrees) in the clockwise or counterclockwise direction of the monitor 101; and a controller 112 for generating a control signal for controlling the first to third driving units 115 to 117 according to a signal of the open/close button 110 and the angle control button 111.

For example, the monitor transference unit 120 is moved along the rack gear 114 according to a rotational force of the first motor 115, and the monitor 101 is rotated by the pre-set angle (e.g., 90 degrees) in the horizontal direction of the monitor 101 according to the rotational force of the second motor 118, so that the screen of the monitor 101 and the front surface of the telematics terminal 100 are parallel with each other, and the monitor 101 is rotated by the pre-set angle (e.g., 90 degrees) in the left or right direction of the monitor 101 according to the rotational force of the third motor 117. Herein, the monitor 101 can be rotated left or right direction according to a position of an image displayed on the monitor 101. Also, the monitor 101 can be rotated by 0~180 degrees according to the rotational force of the second motor 118.

Accordingly, the apparatus for controlling the monitor in the embodiment of the present invention, the wide LCD monitor 101 having the wide screen can be received in the monitor reception space inside the telematics terminal in its horizontal direction. In addition, the user can conveniently view the monitor having the wide screen.

A method for protracting the monitor of the telematics terminal 100 in accordance with the present invention will now be described with reference to FIGS. 5 to 9.

Figure 5:
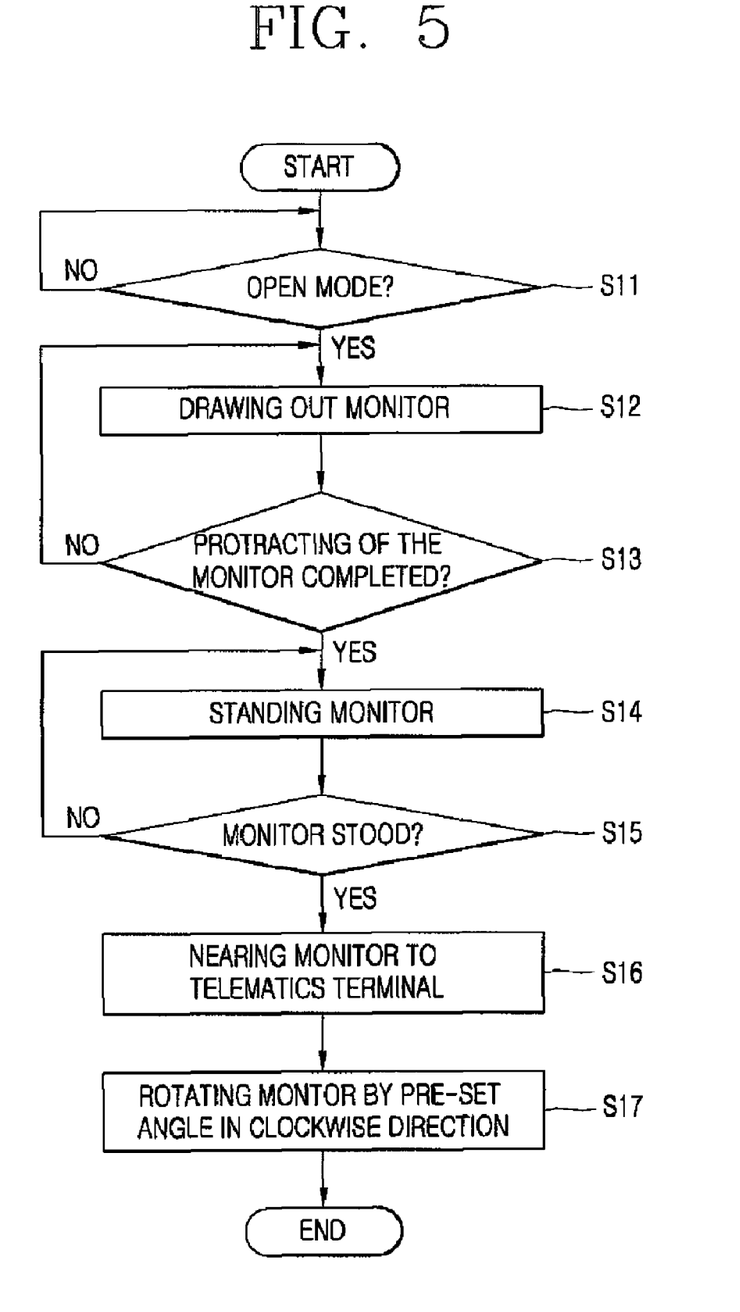
FIG. 5 is a flow chart illustrating the processes of a method for protracting the monitor of the telematics terminal in accordance with the present invention.
Figure 6:
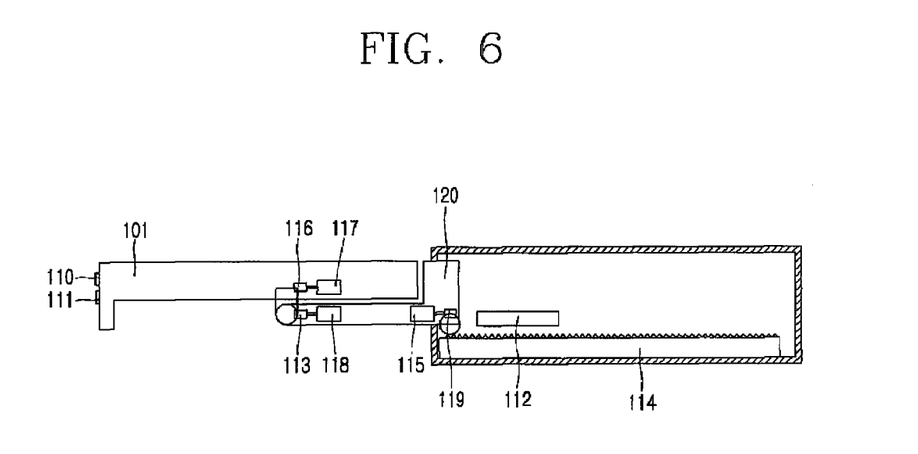
FIG. 6 is a block diagram showing a process of transferring a monitor transference unit of the telematics terminal to outside the telematics terminal in accordance with the present invention.
Figure 7:
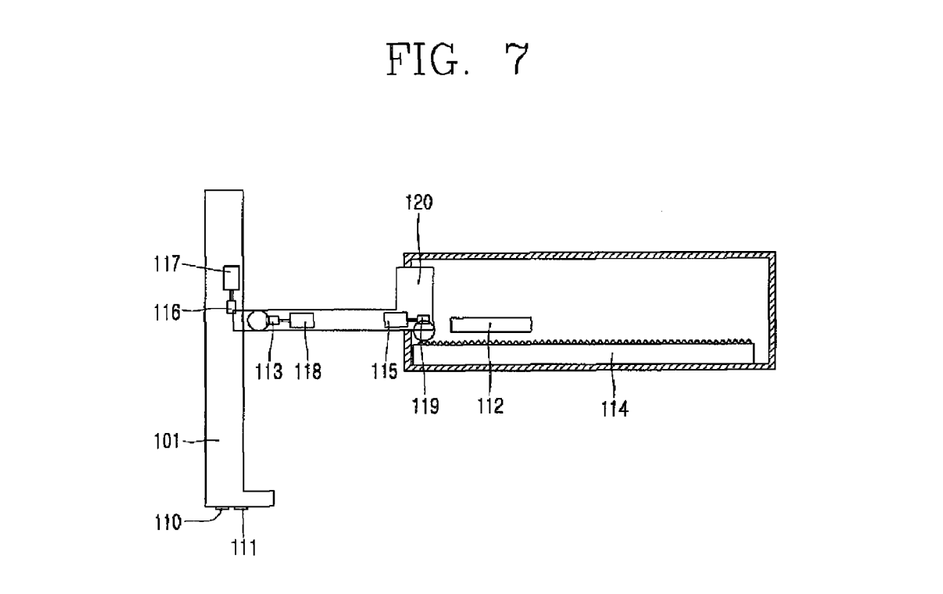
FIG. 7 is a block diagram showing a process of rotating the monitor of the telematics terminal in a horizontal direction of the monitor in accordance with the present invention.
Figure 8:
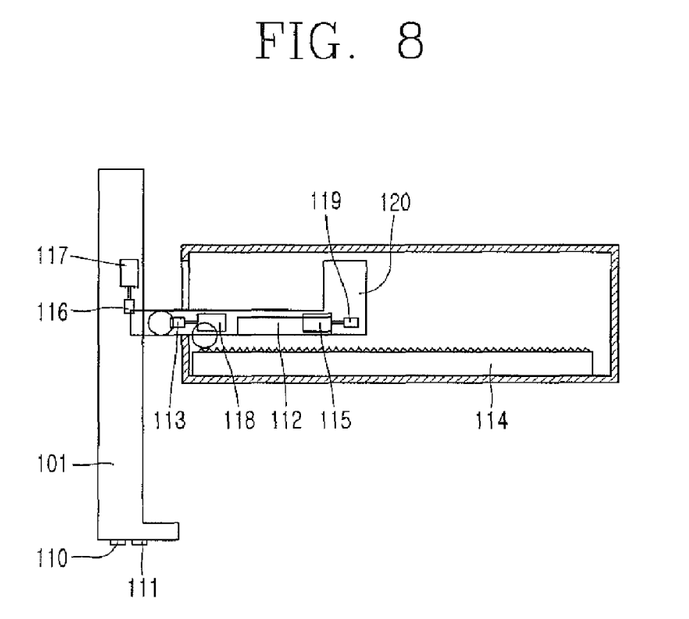
FIG. 8 is a block diagram showing a process of transferring the monitor transference unit into the telematics terminal in accordance with the present invention.
Figure 9:
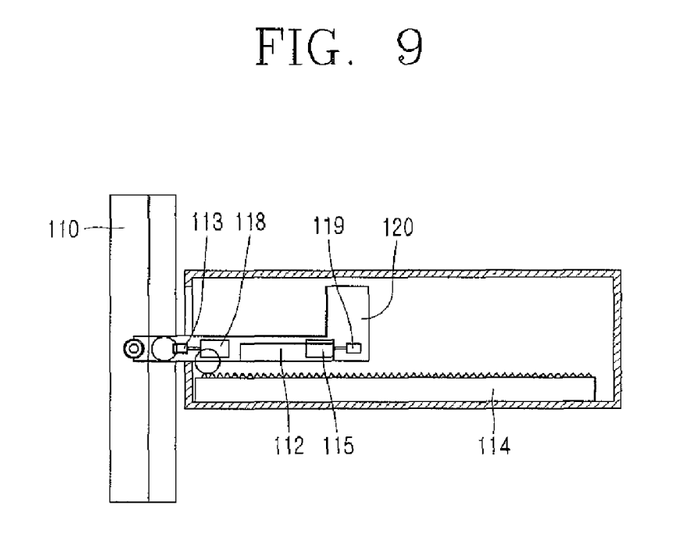
FIG. 9 is a block diagram showing a process of rotating the monitor of the telematics terminal in a left direction of the monitor.

FIG. 5 is a flow chart illustrating the processes of a method for protracting the monitor of the telematics terminal in accordance with the present invention, FIG. 6 is a block diagram showing a process of transferring a monitor transference unit of the telematics terminal to outside the telematics terminal in accordance with the present invention, FIG. 7 is a block diagram showing a process of rotating the monitor of the telematics terminal in a horizontal direction of the monitor in accordance with the present invention, FIG. 8 is a block diagram showing a process of transferring the monitor transference unit into the telematics terminal in accordance with the present invention, and FIG. 9 is a block diagram showing a process of rotating the monitor of the telematics terminal in a left direction of the monitor.

First, when the open/close button 110 is selected by the user, the controller 112 sets an operation mode of the monitor controlling apparatus to a close mode or an open mode. For example, when the monitor 101 is in a protracted state out of the monitor reception space of the telematics terminal 100, the controller 112 switches the operation mode of the monitor controlling apparatus to the close mode, whereas when the monitor 101 is in the retracted state in the monitor reception space of the telematics terminal 100, the controller 112 switches the operation mode to the open mode.

When the operation mode is in the open mode (step S11), the controller generates a first transfer control signal for protracting the monitor 101 and outputs it to the first motor 115.

Then, the first motor 115 is rotated (forward rotation) according to the first transfer control signal, and the first gear connected with the first motor 115 is also rotated according to the rotational force of the first motor 115. At this time, as shown in FIG. 6, since the first gear 119 and the rack gear 114 are in mesh, when the first motor 115 is rotated, the monitor transfer unit 120 is moved along the rack gear 114. Namely, the monitor 101 is drawn out of the telematics terminal according to the rotational force of the first motor 115 (step S12). Herein, the distance that the monitor 101 is drawn out of the telematics terminal 100 can be changed variably depending on a designer, and whether the monitor 101 has been drawing out up to a pre-set position can be easily checked through various position sensors. A detailed description for the techniques regarding the protraction distance and determining whether the monitor 101 has been completely protracted will be omitted.

When the monitor transference unit 120 is moved along the rack gear 114 according to the rotation of the first gear 119 so as to be positioned at an end of the rack gear 114, the controller 112 checks whether the monitor 101 has been completely drawn out through a position sensor (not shown) (step S13).

When the monitor 101 has been completely drawn out, the controller 112 generates a first monitor angle control signal and outputs the generated first monitor angle control signal to the second motor 118. Herein, preferably, the controller 112 generates a monitor angle control signal for rotating the monitor 101 in the horizontal direction of the monitor 101, and according to a user request, the controller 112 can generate a monitor angle control signal for rotating the monitor 101 by 0~180 degrees.

As shown in FIG. 7, the second motor 118 is rotated (forward rotation) according to the first monitor angle control signal. The second gear 113 rotates the monitor 101 by 90 degrees in the horizontal direction of the monitor 101 to thereby stand the monitor 101 (step S14). Herein, the rotation angle of the monitor 101 can be changed variably depending on the designer, and whether the monitor 101 has been rotated up to a pre-set position can be easily checked through various position sensors. A detailed description for the techniques regarding controlling the rotation angle and determining whether the monitor 101 has been rotated up to the pre-set position will be omitted.

When the monitor 101 is stood by 90 degrees (step S15), the controller 112 generates a second transfer control signal and outputs it to the first motor 115.

The first motor 115 is reversely rotated according to the second transfer control signal, and the first gear 119 connected with the first motor 115 is rotated in the opposite direction according to the reserve rotational force of the first motor 115. At this time as shown in FIG. 8, when the first gear 119 in mesh with the rack gear 114 is reversely rotated, the monitor transference unit 120 is inserted into the monitor reception space of the telematics terminal 100 along the rack gear 114. Herein, it is preferred that the monitor transference unit 120 makes the monitor 101 near the telematics terminal 100, not attach to the telematics terminal 100 (step S16). For example, when the monitor transference unit 120 is moved along the rack gear 114 according to the reverse rotation of the first gear 119 so as to be positioned at the end of the rack gear 114, the controller 112 checks whether the monitor 101 has been completely transferred through the position sensor.

Thereafter, when the monitor 101 nears the front surface of the telematics terminal 100, the controller 112 generates a monitor rotation control signal and outputs it to the third motor 117.

Then, the third motor 117 is rotated by the monitor rotation control signal. As shown in FIG. 9, the third gear 116 connected with the third motor 117 rotates the monitor 101 by 90 degrees in the clockwise direction of the monitor 101 according to the rotational force of the third monitor 117. Accordingly, the user can conveniently view movies or TV broadcast programs through the wide LCD monitor 101 inside the vehicle. Herein, the rotation angle of the monitor 101 can be changed in the range of 0~360 degrees by the designer, and whether the monitor 101 has been rotated up to a pre-set position can be easily checked through various position sensors. Accordingly, a detailed description for the techniques regarding controlling the rotation angle and determining whether the monitor 101 has been rotated up to the pre-set position will be omitted.

A method for retracting the monitor 101 of the telematics terminal 100 into the monitor reception space of the telematics terminal 100 in accordance with the present invention will now be described.

Figure 10:
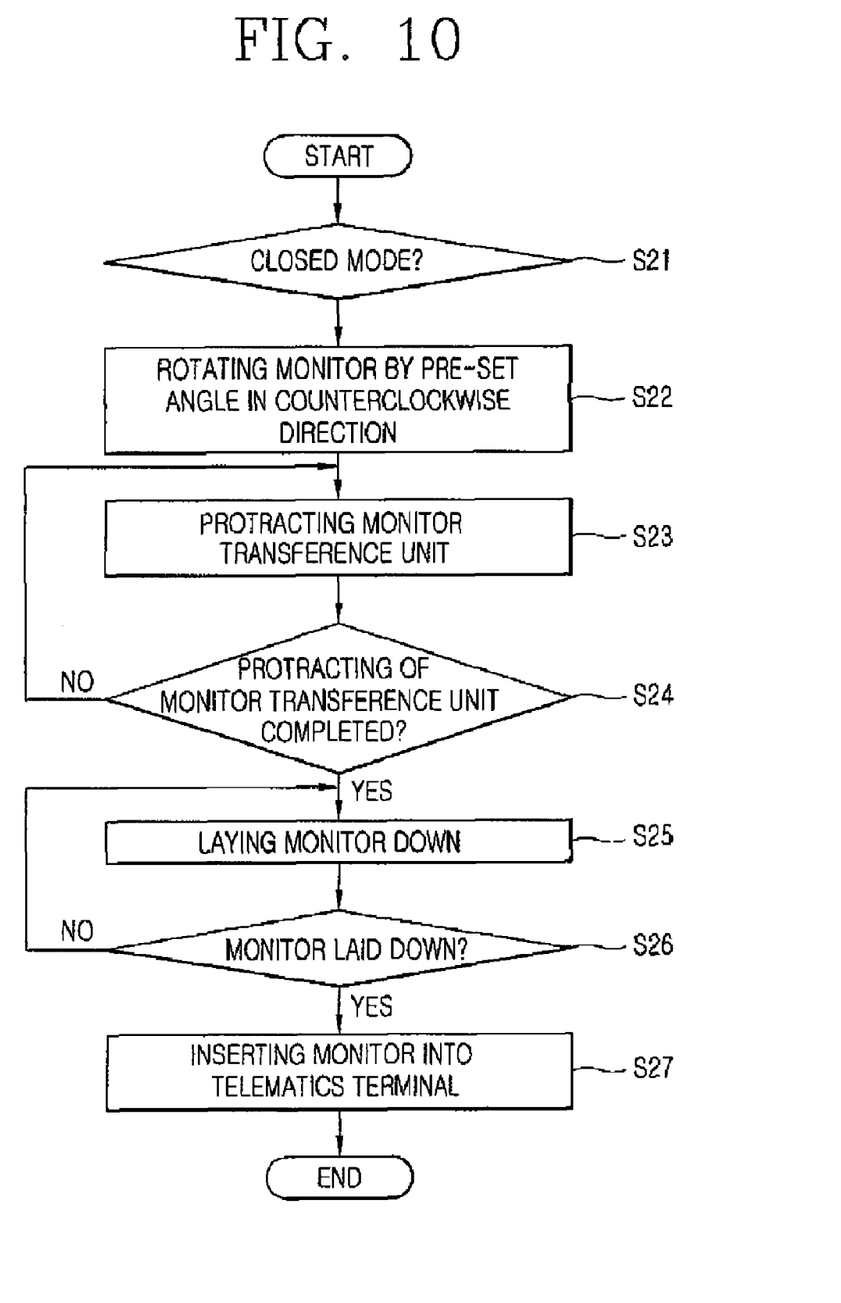
FIG. 10 is a flow chart illustrating the processes of a method for receiving the monitor of the telematics terminal in accordance with the present invention.

FIG. 10 is a flow chart illustrating the processes of a method for receiving the monitor of the telematics terminal in accordance with the present invention. The process of retracting the monitor is performed in the reverse order of the process of protracting the monitor 101.

First, in a state that the monitor 101 is drawn out of the monitor reception space of the telematics terminal 100, when the open/close button 110 is selected, the controller 112 switches the operation mode to the close mode.

When the operation mode is the close mode (step S21), the controller generates a monitor reverse rotation control signal and outputs it to the third motor 117.

Then, the third motor 117 is reversely rotated according to the monitor reverse rotation control signal, and the third gear 116 connected with the third motor 117 rotates the monitor 101 in the counterclockwise direction of the monitor 101 according to the reverse rotational force of the third motor 117 (step S22).

When the monitor 101 is reversely rotated by 90 degrees, the controller generates a first transfer control signal and outputs it to the first motor 115.

Then, the first motor 115 is rotated according to the first transfer control signal and the first gear 119 connected with the first motor 115 is rotated according to the rotational force of the first motor 115. At this time, since the first gear 119 and the rack gear 114 are in mesh with each other, when the first motor 115 is rotated, the monitor transference unit 120 is moved along the rack gear 114. That is, the monitor transference unit 120 is drawn out of the telematics terminal 100 according to rotational force of the first motor 115.

When the monitor transference unit 120 is completely drawn out (step S24), the controller 112 generates a second monitor angle control signal, and outputs it to the second motor 118. Herein, the controller 112 generates a signal for reversely rotating the monitor 101 by 0 degree in the horizontal direction of the monitor 101.

The second motor 118 is reversely rotated according to the second monitor angle control signal and the second gear 113 reversely rotates the monitor 101 by 0 degree in the horizontal direction of the monitor 101 according to the reverse rotational force of the second motor 118, thereby laying the monitor 101 down in the horizontal direction (step S25).

When the monitor 101 is horizontally laid down (step S26), the controller 112 generates the second transfer control signal and outputs it to the first motor 115.

The first motor 115 is reversely rotated according to the second transfer control signal, and the first gear 119 connected with the first motor 115 is reversely rotated according to the reverse rotational force of the first motor 115. At this time, when the first gear 119 in mesh with the rack gear 114 is reversely rotated, the monitor 101 is inserted into the monitor reception space of the telematics terminal 100 along the rack gear 114 (step S27).

As so far described, the apparatus and monitor for controlling the monitor of the telematics terminal in accordance with the present invention have many advantages.

That is, for example, first, the wide monitor having the horizontal length greater than the vertical length can be easily received into the telematics terminal located in a limited space inside the vehicle. For example, by inserting the wide monitor having the horizontal length greater than the vertical length into the telematics terminal, the wide monitor having the size exceeding 8 inches can be received into the reception space having the size of 1 DIN.

Second, by drawing out the monitor having the horizontal length greater than the vertical length in the horizontal direction, rotating the monitor by the pre-set angle in the horizontal direction, and rotating the rotated monitor by the pre-set angle in the left or right direction of the monitor, the user can easily view the wide monitor conveniently and easily in the limited space of the vehicle.

Third, by insertedly keeping the wide monitor inside the telematics terminal, a possibility of damage of the wide monitor can be reduced.

Fourth, since the monitor transference unit, the power cable and the audio/video input cable are not exposed, a possibility that they are stolen can be prevented.

Fifth, the apparatus and method for controlling the monitor can be applied to various audio and/or video systems having a monitor as well as to the telematics terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for controlling a display unit in a telematics terminal of a vehicle comprising:
a body of the telematics terminal of the vehicle, the body having a front side having a height and a width, the width being greater than the height;
a rack gear installed in the body;
a transference unit configured to support the display unit of the telematics terminal, positioned at an upper side of the rack gear, and configured to transfer the display unit along the rack gear while a screen of the display unit is in a horizontal direction during operation in the ordinary operating orientation of the vehicle;
a first driving unit installed at the transference unit and configured to rotate a first gear of the first driving unit engaged with the rack gear while the screen of the display unit is in a horizontal direction, wherein a first length along a first direction of the display unit is longer than a second length along a second direction of the display unit, the first direction being orthogonal to the second direction, and the transference unit being configured to draw the display unit out of the telematics terminal in the first direction of the display unit while the screen of the display unit is in the horizontal direction;
a second driving unit installed at the transference unit and connected with a second gear which rotates the display unit to a first pre-set angle such that the screen of the display unit is shifted to the vertical direction;
a third driving unit installed at the display unit and connected with a third gear which rotates the display unit to a second pre-set angle while the screen of the display unit is in the vertical direction, such that the first length of the display unit is oriented parallel to the width of the front side of the body and the first length is longer than the width of the front side of the body; and
a controller configured to control the first, second, and third driving units.

2. The apparatus of claim 1, wherein the controller controls the first, second, and third driving units according to a user request.

3. The apparatus of claim 1, wherein the display unit is a wide LCD (Liquid Crystal Display) monitor.

4. The apparatus of claim 1, wherein the first pre-set angle is 90 degrees and the second pre-set angle is 90 degrees.

5. The apparatus of claim 1, wherein the first pre-set angle or the second pre-set angle is varied by a user.

6. The apparatus of claim 1, wherein the first, second, and third driving units are motors.

7. An apparatus comprising:
a body of a telematics terminal, the body defining a reception space and having a front side having a height and a width, the width being greater than the height;
a display unit of a telematics terminal, said display unit comprising a screen, said display unit having a stowed orientation in which said display unit is accommodated in the reception space and in which said screen is positioned flat with respect to said body for stowing therein, the display unit having a portrait display configuration in which said screen faces a user in a portrait layout, and the display unit having a landscape display configuration in which said screen faces the user in a landscape layout, the screen having a first length, a second length, and a third length, each being orthogonal to the other two lengths, the first length being longer than the second length, and the second length being longer than the third length;

a lateral movement mechanism to move said display unit in a planar manner into or out of said body in the direction of the first length of the screen when said display unit is oriented in said stowed configuration;

a pivoting mechanism to pivot said display unit about a pivot axis to enable the display unit to move between said stowed configuration and said portrait display configuration; and a rotating mechanism to rotate said display unit about a rotation axis to enable the display unit to move between said portrait and said landscape display configurations, wherein the lateral movement mechanism is configured to draw the display unit out of the reception space in a direction of the first length of the screen while the screen is in a horizontal direction, and wherein in the landscape configuration, the first length of the screen is parallel to and longer than the width of the front side of the body.

8. An apparatus comprising:

a body defining a storage compartment having a height, a width, and a depth, each orthogonal to each other, the depth being greater than the width and the height, the body having a front side having a height and a width, the width of the front side of the body being greater than the height of the front side of the body;

a display having a first length and a second length, the first length being longer than the second length and the first length being orthogonal to the second length; and a transference unit coupled to the display and configured to transfer the display between a stored orientation and a displayed orientation, the position of the first length while the display is oriented in the displayed orientation being orthogonal to the position of the first length while the display is oriented in the stored orientation, wherein while the display is oriented in the stored orientation, a display length measured along an axis orthogonal to the height and depth of the storage compartment is less than a display length measured along an axis orthogonal to the height and width of the storage compartment, wherein while the display is oriented in the displayed orientation, a display length measured along an axis orthogonal to the height and depth of the storage compartment is greater than the width of the front side of the body.

9. The apparatus of claim 8, wherein while the display is in the stored orientation, the second length of the display is oriented substantially parallel to the width of the storage compartment and the first length of the display is oriented substantially parallel to the depth of the storage compartment, and wherein while the display is oriented in the displayed orientation, the first length of the display is oriented substantially parallel to the width of the storage compartment and the first lengreater than the width of the front side of the body.

10. The apparatus of claim 9, wherein while the display is in the displayed orientation, the second length of the display is oriented substantially orthogonal to the width and depth of the storage compartment and the second length is greater than the height of the storage compartment.

11. The apparatus of claim 8, wherein the front side of the body is oriented in a plane substantially perpendicular to the ground, the display has a surface, the surface being oriented substantially perpendicular to the ground while the display is in the displayed orientation and the surface being oriented substantially parallel to the front side of the body while the display is in the displayed orientation, and the length of the surface substantially parallel to the ground is longer than the length of the front side of the body substantially parallel to the ground, and the length of the display substantially perpendicular to the ground is longer than the length of the front side of the body substantially perpendicular to the ground.

12. The apparatus of claim 11, wherein while the display is in the displayed orientation, the display is substantially centered relative to the height and the width of the front side of the body.

13. The apparatus of claim 8, wherein the width of the storage compartment is greater than the height of the storage compartment, and the first length of the display is longer than the width of the storage compartment and the second length of the display is longer than the height of the storage compartment.

14. The apparatus of claim 13, wherein the transference unit has opposite lateral sides and upper and lower sides, and wherein while the display is positioned in the displayed orientation, the display extends a substantially equal distance past the lateral sides of the transference unit in a direction parallel to the first length, and the display extends a substantially equal distance past the upper and lower sides of the transference unit the direction of the second length.

15. The apparatus of claim 8, wherein the display has a third length orthogonal to the first length and the second length, the third length being shorter than the first length and the second length, and wherein the transference unit is further configured to draw the display out of the storage compartment in the direction of the first length of the display.

16. The apparatus of claim 8, wherein while the display is oriented in the displayed orientation, the display completely covers the front side of the body.

17. The apparatus of claim 1, wherein after the display unit is rotated to the second pre-set angle, the screen completely covers the front side of the body.

18. The apparatus of claim 7, wherein in the landscape configuration, the screen completely covers the front side of the body.

* * * * *